US008355064B2

(12) United States Patent
van Beek

(10) Patent No.: US 8,355,064 B2
(45) Date of Patent: Jan. 15, 2013

(54) NOISE REDUCTION FOR MACHINE VISION SYSTEMS

(75) Inventor: Petrus J. L. van Beek, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 13/100,060

(22) Filed: May 3, 2011

(65) Prior Publication Data

US 2012/0075506 A1 Mar. 29, 2012

Related U.S. Application Data

(63) Continuation-in-part of application No. 12/890,955, filed on Sep. 27, 2010.

(51) Int. Cl.
*H04N 5/217* (2011.01)

(52) U.S. Cl. .......................... 348/241; 348/246

(58) Field of Classification Search .................. None
See application file for complete search history.

(56) References Cited

U.S. PATENT DOCUMENTS

| 7,623,723 | B2 | 11/2009 | Avinash |
| 7,652,788 | B2 | 1/2010 | Foi et al. |
| 7,783,124 | B2 | 8/2010 | Chen et al. |
| 2007/0147697 | A1* | 6/2007 | Lee et al. ...................... 382/260 |
| 2007/0296871 | A1 | 12/2007 | Yoo et al. |
| 2008/0159645 | A1* | 7/2008 | Kempf et al. ................. 382/264 |
| 2009/0021611 | A1* | 1/2009 | Utsugi .......................... 348/241 |
| 2009/0272882 | A1* | 11/2009 | Rabner ...................... 250/214 A |

OTHER PUBLICATIONS

Abreu et al., A Signal-Dependent Rank Ordered Mean (SD-ROM) Filter—A New Approach for Removal of Impulses from Highly Corrupted Images, IEEE ICASSP 1995, pp. 2371-2374.
Hardie et al., Rank-Conditioned Rank Selection Filters for Signal Restoration, IEEE Trans. on Image Processing, vol. 3, No. 2, Mar. 1994, pp. 192-206.
Kuan et al., Adaptive Noise Smoothing Filter for Images with Signal-Dependent Noise, IEEE Trans. on Pattern Analysis and Mach. Intell., vol. 7, No. 2, Mar. 1985, pp. 165-177.

* cited by examiner

*Primary Examiner* — Chieh M Fan
*Assistant Examiner* — Angel L Garces-Rivera
(74) *Attorney, Agent, or Firm* — Chernoff Vilhauer McClung & Stenzel, LLP

(57) ABSTRACT

A method for reducing noise in an image from an image capture device includes filter the image using both an offset fixed pattern noise filter and a gain fixed pattern noise filter. Thereafter, the image is filtered using a remnant fixed pattern noise filter to reduce remnant fixed pattern noise.

19 Claims, 9 Drawing Sheets

OVERVIEW OF NOISE CHARACTERIZATION
AND NOISE REDUCTION SYSTEM

FIG. 1 OVERVIEW OF NOISE CHARACTERIZATION
AND NOISE REDUCTION SYSTEM

FIG. 2 OVERVIEW OF THE NOISE REDUCTION SUB-STAGES

FIG. 3 MEASURING THE GAIN FPN COMPONENT ($C_{FPN}$)

FIG. 4 MEASURING THE OFFSET FPN COMPONENT ($D_{FPN}$).

FIG. 6  NOISE REDUCTION STEPS (ONLINE)

FIG. 7 EXAMPLE OF OPERATION OF FILTER

FIG. 8 EXAMPLE OF OPERATION OF FILTER

NOISE REDUCTION FOR MACHINE VISION SYSTEMS

CROSS-REFERENCE TO RELATED APPLICATIONS

This application is a continuation-in-part of U.S. Patent Application entitled Camera Noise Reduction For Machine Vision Systems, U.S. application Ser. No. 12/890,955, filed Sep. 27, 2010.

BACKGROUND OF THE INVENTION

The present invention relates to reducing noise in images captured from a camera.

Digital cameras acquire images using a CCD or CMOS sensor, which contains a two-dimensional array of sensor elements. Each CCD or CMOS element converts light into electrons that are subsequently converted into a (digital) signal. Each such element may correspond to a pixel in an image or frame captured by the camera. In addition to the desirable signal, invariably the image or pixel data that is output from the sensor or camera contains undesirable noise. There are many different types of noise originating from the sensor and camera device, for example, fixed-pattern noise, read-out noise, and shot noise. In order to accurately identify the underlying image content, the noise needs to be suppressed or otherwise removed.

Dark current is one cause of fixed pattern noise ("FPN"). Dark current is generally the result of spurious charge accumulating in each CCD or CMOS sensor element, even in the absence of light. Different amounts of spurious charge accumulate in different elements, hence, the fixed pattern noise results in spatially non-uniform patterns in the captured image. However, the spatial distribution is substantially time invariant, hence part of the dark current noise can be characterized as fixed-pattern noise. This type of FPN may be referred to as Dark Signal Non-Uniformity ("DSNU"). In addition to such DSNU noise, there is also dark current shot noise, which is spatially and temporally random noise on top of the dark current. Furthermore, the dark current noise is temperature-dependent, which makes the phenomenon less predictable in situations where temperature varies. In general, the dark current noise increases with increasing temperature.

Shot noise is fundamentally connected to the way photons arrive at detector elements. Photon shot noise is a spatially and temporally random phenomenon. Its noise variance generally depends on the signal strength. Read out noise may be considered as encompassing other random noise sources that are not generally dependent on signal strength, similar to additive white Gaussian noise. These may include amplifier noise, analog-to-digital conversion (ADC) noise, and several other types of noise.

It is desirable to reduce many of the different types of noise originating from the sensor and camera device, such as, fixed-pattern noise, read-out noise, and/or shot noise to accurately identify the underlying image content.

The foregoing and other objectives, features, and advantages of the invention may be more readily understood upon consideration of the following detailed description of the invention, taken in conjunction with the accompanying drawings.

DETAILED DESCRIPTION OF THE PREFERRED EMBODIMENT

Figure 1:
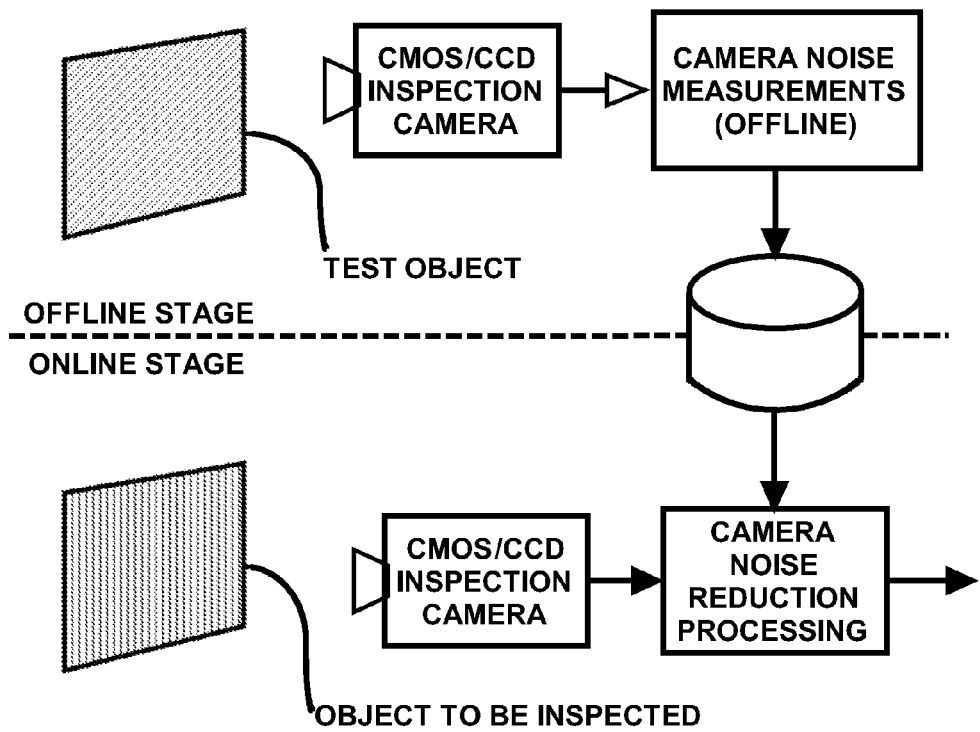
FIG. 1 illustrates an overview of a system for noise characterization and noise reduction.

A system for characterizing the noise and for reducing noise in camera images is illustrated in FIG. 1. The system includes an offline stage and an online stage. The offline stage consists of measurements and characterization of the noise using the same camera (or similar camera) that is used in the online (production) stage. The offline stage is typically performed infrequently, perhaps even only once, for each specific camera and/or camera configuration and/or set of camera settings. Hence, it is typically not required to operate under real-time constraints. In the offline stage, test objects (test targets) are positioned in the scene that is imaged using the camera. A series of images is captured, processed, and analyzed to extract the relevant noise characteristics. These characteristics are stored in a suitable storage medium, for example on a computer hard disk. The storage medium may be connected to or part of a host computer system separate from the camera itself.

The online stage refers to the actual use of the camera and image processing system in a production environment. The noise reduction stage processes images of objects that are to be analyzed, and reduces the noise in each image, before the image is forwarded to the actual analysis stages (e.g. an inspection stage). The online noise reduction stage repeatedly utilizes the noise characteristics stored on the storage medium. The online stage is typically subject to real-time operating constraints, hence, the noise reduction image processing stage is typically required to operate within a limited processing time. This stage may be implemented by a suitable combination of hardware and software. For example, this stage may be implemented by a personal computer running suitable image processing software for noise reduction.

Figure 2:
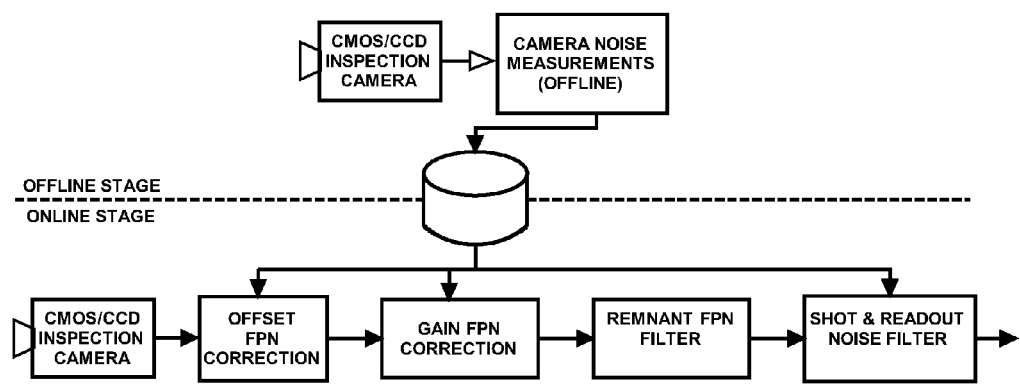
FIG. 2 illustrates noise reduction sub-stages.

Referring to FIG. 2, an overview of the noise reduction sub-stages is illustrated which include sub-stages to reduce offset FPN and to reduce gain FPN. These two sub-stages may be separate stages or combined into a single sub-stage. These sub-stages substantially reduce the FPN, but unfortunately some of the noise still remains. For example, FPN may still exist in the image after these initial stages, generally referred to herein as remnant fixed pattern noise (remnant FPN). In some cases, this remnant FPN may be the result of dark current shot noise. This remnant FPN may also be the result of a difference in the operating temperature compared to the instance when the FPN calibration measurements were performed. In some applications, it may be difficult to sufficiently control or even measure the operating temperature. Hence, the FPN may be overcompensated, or undercompensated. It is therefore useful to provide additional processing to remove remnant FPN. An additional sub-stage may be used to remove or otherwise reduce remnant FPN. The remnant FPN may use any suitable filter, such as extended rank-conditioned median filter. The final sub-stage suppresses readout noise and shot noise. The shot and readout noise filter may use any suitable filter, such as an extended adaptive noise smoothing filter.

The noise model may consider each image as a two-dimensional (2-D) array of size M×N pixels. A pixel location in the 2-D image is indicated by (i,j). Also, if the system uses a series of multiple images, it may use the notation (i,j,k) to indicate a pixel location in the k'th image. A model for the image and noise may be as follows.

$$g(i,j,k) = c_{FPN}(i,j) \cdot f(i,j,k) + d_{FPN}(i,j) + n_T(i,j,k) \quad \text{Equation 1}$$

where:

$f(i,j,k)$ is the "true" image that the system wants to measure (the "desired signal");

$g(i,j,k)$ is the "actual image" that was captured by the camera, i.e., the data;

$d_{FPN}(i,j)$ is the non-uniform offset/bias FPN, due to DSNU (Dark Signal Non-Uniformity);

$c_{FPN}(i,j)$ is the non-uniform gain FPN, due to PRNU (Pixel Responsivity Non-Uniformity);

$n_T(i,j,k)$ is temporal random noise, containing both read noise and shot noise:

$$n_T(i,j,k) = n_{READ}(i,j,k) + n_{SHOT}(i,j,k) \quad \text{Equation 2}$$

The read noise comprises generally signal-independent noise sources. It generally has zero mean and is mainly characterized by its variance.

$$Var[n_{READ}(i,j,k)] = \sigma_{READ}^2 \quad \text{Equation 3}$$

The read noise variance is assumed to be constant, e.g. the same at each pixel location, in every image.

The shot noise is signal-dependent and is characterized by a variance that depends on the signal value at the particular pixel location.

$$Var[n_{SHOT}(i,j,k)] = \alpha \cdot f(i,j,k) \quad \text{Equation 4}$$

where $\alpha$ represents the overall gain in pixel Digital Number (DN) per electron.

The variance of the two noise sources add up to the overall temporal random noise variance.

$$Var[n_T(i,j,k)] = \sigma_{READ}^2 + \alpha \cdot f(i,j,k) \quad \text{Equation 5}$$

Note that the non-uniform offset and gain appear random spatially, but are substantially fixed in time, so substantially the same in every image.

Figure 3:
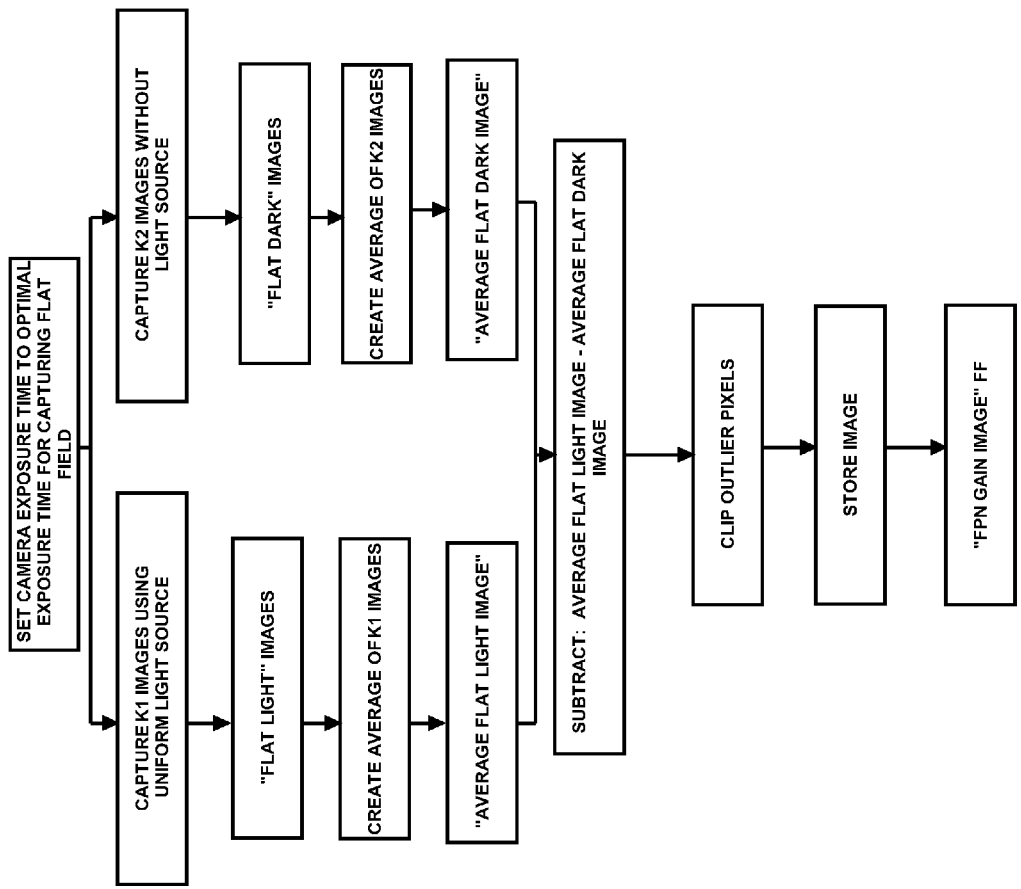
FIG. 3 illustrates measuring the gain of fixed pattern noise.

Referring to FIG. 3, the non-uniform gain FPN may be characterized by the 2-D array (M×N pixels) $c_{FPN}(i,j)$. A camera with a perfectly uniform response may have $c_{FPN}(i,j)=1$ in all pixels. A deviation from the value 1 represents a non-uniformity in the gain. This gain component may be measured. The system may use a spatially uniform light source aimed at the camera and capture multiple images of this uniform field ("flat field"). For example, such a uniform light source may be provided by an integrating sphere. Let K1 be the number of images captured with the camera. K1 which should be a significant number, e.g. K1>9. Also, any parameter settings of the camera as well as imaging conditions should be the same (or generally the same) for each image, as the conditions and parameters used in the on-line (production) stage. Since a flat field is presented to the camera, the actual signal should be a constant value across the image.

$$f(i,j,k) = \mu_{FF} \quad \text{Equation 6}$$

Also, the image should be the same, other than the temporal noise, across the K1 captures. If the system averages these K1 captures together, the random temporal noise will be suppressed. Hence, considering equation 1 and equation. 6, this average image is given by:

$$g_{light}^{AVE}(i,j) = \frac{1}{K1}\sum_{k=1}^{K1} g(i,j,k) \approx c_{FPN}(i,j) \cdot \mu_{FF} + d_{FPN}(i,j) \quad \text{Equation 7}$$

This average image contains the gain FPN component, but also still contains the offset FPN component. To remove and/or reduce the offset FPN component, another series of images may be captured with the same camera, in the same conditions, except that no light is presented to the camera/sensor. The exposure time used to capture this series of "dark" images is the same as (or substantially the same as) the exposure time used when capturing the above flat field images with light. Let K2 be the number of such "dark" images captured. Again, K2 should be a significant number, e.g. K2>9. Without any light, $f(i,j)=0$. Hence, considering again equation 1, when the system averages these K2 images together, the average image is given as follow.

$$g_{dark}^{AVE}(i,j) = \frac{1}{K2}\sum_{k=1}^{K2} g(i,j,k) \approx d_{FPN}(i,j) \quad \text{Equation 8}$$

Again, the random noise will be suppressed due to the averaging.

The gain of the FPN component can be computed by subtracting the second average image from the first image, pixel by pixel, as illustrated in equation 9.

$$FF(i,j) = g_{light}^{AVE}(i,j) - g_{dark}^{AVE}(i,j) \approx c_{FPN}(i,j) \cdot \mu_{FF} \quad \text{Equation 9}$$

The system may apply post-processing to this "FPN gain image" or "flat field image" $FF(i,j)$. Namely, the system may compute its global mean and global standard deviation. Then, the system may clip the image such that the final estimated flat field pixel values fall between a global minimum and a global maximum value based on a constant parameter value. For example, the minimum may be the global mean minus 3.0× the global standard deviation, and the maximum may be the global mean plus 3.0× the global standard deviation. The flat field image $FF(i,j)$ is then stored, for later on-line correction of gain FPN.

Figure 4:
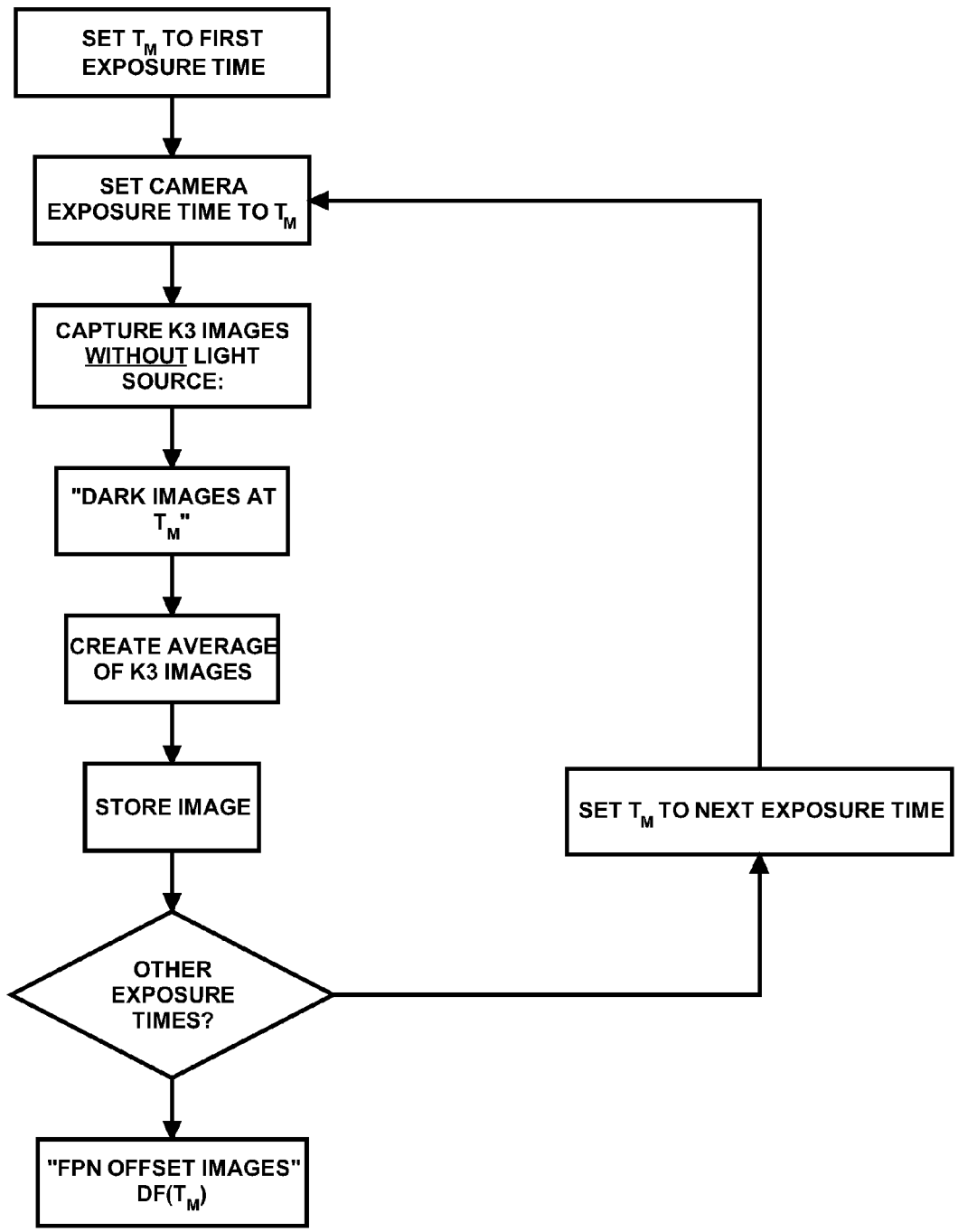
FIG. 4 illustrates measuring the offset of fixed pattern noise.

The non-uniform offset FPN may be characterized by the 2-D array (M×N pixels) $d_{FPN}(i,j)$. A camera without offset FPN may have a value of $d_{FPN}(i,j)$ equal to 0 or some constant in all pixels. This offset component can be measured using any suitable technique, such as the technique shown in FIG. 4.

The system may capture a series of "dark frames", i.e., take images while presenting no light to the camera or sensor (using the lens cap or with the shutter closed). This should be done at several exposure times. Let a particular exposure time be denoted by $t_m$. For example, $t_m=100$ ms. The offset FPN component associated with that exposure time is denoted by $d_{FPN,t_m}(i,j)$. Let K3 be the number of such "dark" images captured with exposure time $t_m$. Again, K3 should be as large as possible, e.g. K3>9. Without any light, $f(i,j)=0$. Hence, considering again equation 1, when averaging these K3 images together, the average image is given by:

$$DF_{t_m}(i,j) = g_{dark,t_m}^{AVE}(i,j) \quad \text{Equation 10}$$

$$= \frac{1}{K3}\sum_{k=1}^{K3} g(i,j,k) \approx d_{FPN,t_m}(i,j)$$

Again, the random noise will be suppressed due to the averaging. This image is referred to as "FPN offset image" or "average dark frame". Such an average dark frame $DF_{t_m}(i,j)$ should be obtained for each exposure time needed. These average dark frames $DF_{t_m}(i,j)$ are stored, for later on-line correction of offset FPN. This concludes the steps used for off-line characterization of the FPN.

Figure 5:
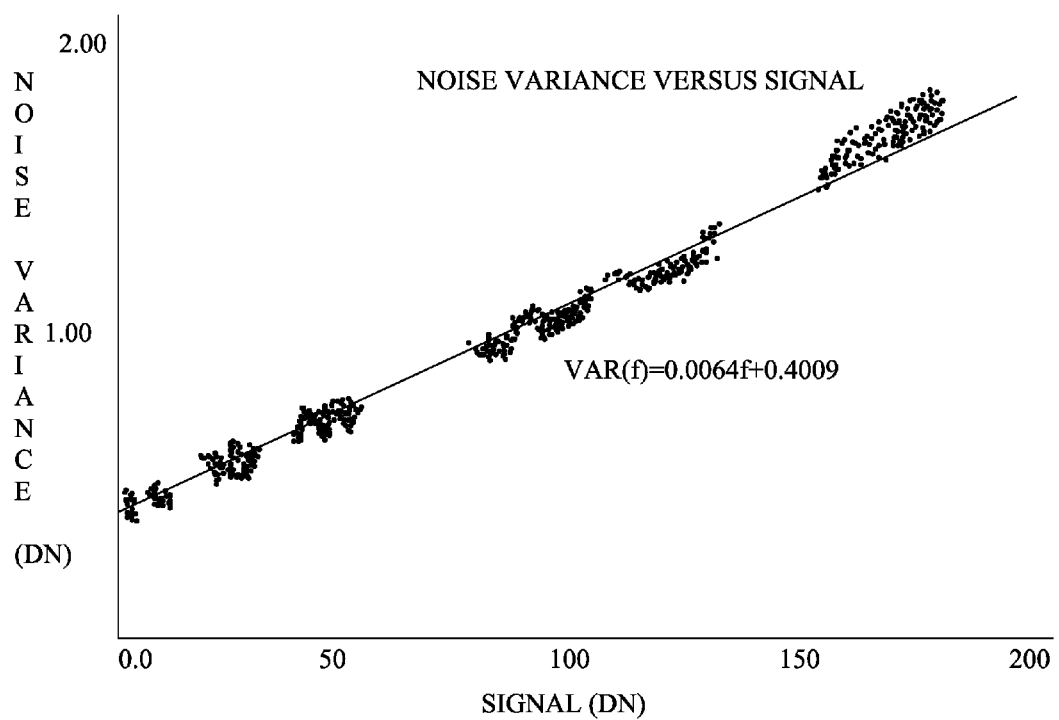
FIG. 5 illustrates estimation of random noise parameters.

Another off-line step may be performed that relates to the characterization of the temporal random noise component $n_T(i,j,k)$. The variance of the random noise is described by equation 5. The parameters characterizing the variance of the read and shot noise are the read noise variance $\sigma_{READ}^2$ and shot noise gain $\alpha$. For purposes of estimating these parameters for the specific camera being used, data points of the noise variance versus the signal level should be obtained. For example, a series of data frames may be taken at increasing exposure times. That is, the system may set the exposure times at increasing values, e.g. 1, 2, 3, . . . , 100, . . . , 200, . . . ms. At each exposure time, the system may capture 2 data frames (or more) of a uniform (blank) target. The system may also capture a set of dark frames at that exposure time. One of the data frames is subtracted from the other data frame. The system may define multiple measurement windows in the subtraction resulting image, where each measurement window may be a square region of multiple pixels, e.g. 64×64 pixels, or 128×128 pixels, or 256×256 pixels. In each window, the system computes the variance, and divides it by 2.0 (correcting for the subtraction). The system may also compute a "true" signal value for each measurement window, by subtracting the average value of the measurement window in the (averaged) dark frame from the average value of the corresponding measurement window in the data frame. Hence, for that measurement window, the system has a single <signal, variance> data point. By compiling all data points for multiple measurement windows and for multiple exposure times, the system has a collection of data points at various levels of the signal (and corresponding variance value). These data points may be plotted in a graph, for example as shown in FIG. 5. As can be seen in FIG. 5, the data points follow a linear behavior, as predicted the model in equation 5. The parameters of the model can be estimated easily from the collected data points by fitting them to a linear model (straight line), e.g. using a standard linear least-squares fitting procedure. This provides us with an estimate of $\sigma_{READ}^2$ and $\alpha$ for the camera.

Figure 6:
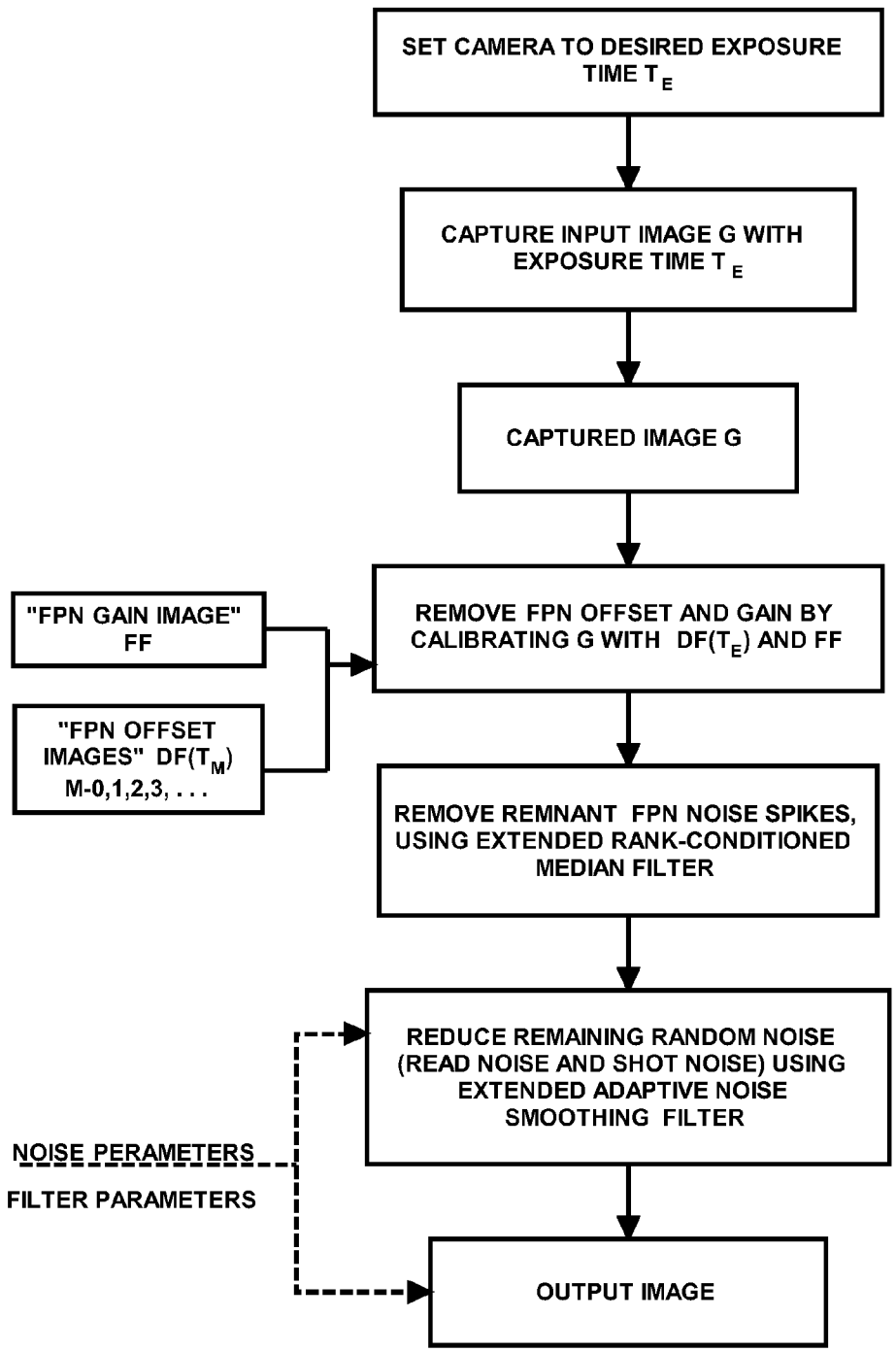
FIG. 6 illustrates on-line noise reduction.

Referring to FIG. 6, an overview of the on-line noise reduction process is shown where a first image is captured using a desired exposure time $t_e$. Subsequently, the FPN offset and gain components in this capture are removed by calibration, using the FPN gain image and FPN offset image with the appropriate exposure time. The system removes the offset component first, followed by removal of the gain component, as shown in FIG. 2. These two sub-steps can also be implemented together, or reversed. Let the captured image be denoted by $g_{t_e}(i,j,k)$. A first estimate of the "true" image $f(i,j,k)$ can be computed as follows:

$$\hat{f}(i, j, k) = \frac{g_{t_e}(i, j, k) - DF_{t_e}(i, j)}{FF(i, j)} \times \hat{\mu}_{FF} \qquad \text{Equation 11}$$

The average value of the flat field may be estimated by taking the spatial average of the flat field image:

$$\hat{\mu}_{FF} = \frac{1}{M \times N} \sum_{i=1}^{M} \sum_{j=1}^{N} FF(i, j) \qquad \text{Equation 12}$$

The FPN calibration step significantly reduces FPN in the image. However, the FPN components may not be perfectly predictable, as previously discussed. The FPN in the image may be undercompensated or overcompensated. Hence, there may be remaining FPN apparent in the image at this stage. This remnant FPN generally appears as spike noise or impulse noise in the image; i.e., it consists of multiple, isolated spikes that may have a significantly higher or lower value than the surrounding pixels. The FPN reduction step is intended to remove or otherwise reduce this remnant spike (impulse) noise, while attempting to avoid any removal of image (scene) features.

One approach to removing impulse noise is use a median filter, e.g., using a 3×3 pixel window. However, the median filter does not discriminate between impulse noise and image features; hence, there is a significant likelihood of removing small image features. The system may utilize a specific instance of the so-called Rank-Conditioned Rank-Selection filter family. Specifically, use a Rank-Conditioned Median filter, extended to further ensure small image features are not removed.

The Extended Rank-Conditioned Median filter may be defined as follows. The system may use a sliding 3×3 window that passes over the image pixels. At any position, the system may have 9 pixel values inside the 3×3 window, which may be denoted by a vector $[f_1, f_2, f_3, f_4, f_5, f_6, f_7, f_8, f_9]$. The ordering is such that $f_5$ is the center pixel in the 3×3 window. These pixel values may be ranked from low to high, and the resulting vector of ranked pixel values is denoted given by $[r_1, r_2, r_3, r_4, r_5, r_6, r_7, r_8, r_9]$, where $r_1 \leq r_2 \leq r_3 \ldots \leq r_9$. In other words, $r_1$ is the pixel value in the window with rank 1, i.e. the minimum; $r_9$ is the pixel value in the window with rank 9, i.e. the maximum; and $r_5$ is the median pixel value. In the system, an isolated noise spike is detected first, by checking if the center pixel value has either rank 1 (the minimum in the window) or rank 9 (the maximum in the window). If the center pixel does not have rank 1 or 9, it is not a noise spike and no action is taken. In this case, the center pixel is not replaced and retains its original value. If the center pixel value has rank 1, then the system determines the difference between the center pixel value ($r_1$) and the pixel with the next higher value ($r_2$). Or, if the center pixel value has rank 9, then the system determines the difference between the center pixel ($r_9$) and the pixel with the next lower value ($r_8$). If the absolute value of this difference is larger than a pre-specified threshold $T_{RCM}$, then the filter classifies the center pixel as a noise spike due to remnant FPN. In that case, the center pixel value is replaced by the median value ($r_5$). The Extended Rank Conditioned Median filter can be specified as follows, $$\hat{f}_c \leftarrow \begin{cases} r_5 & \text{if } (f_5 = r_1) \wedge (r_2 - r_1 > T_{RCM}) \\ r_5 & \text{if } (f_5 = r_9) \wedge (r_9 - r_8 > T_{RCM}) \\ f_5 & \text{otherwise} \end{cases} \qquad \text{Equation 13}$$

where $\hat{f}_c$ is the estimate for the center pixel. An example threshold value is $T_{RCM}=8$. Note that the threshold value may be fixed. Alternatively, the threshold may be decided adaptively, based on an estimate of the strength of the remnant FPN.

The sequence of sub-steps taken to determine the Extended Rank Conditioned Median output may be modified, as desired. For example, different ranking (sorting) techniques may be used. As another example, the filter may be optimized by noting that a complete ranking may not be necessary to realize the filter previously discussed. As another example, the filter may be optimized further by considering and processing the pixel values in multiple, neighboring, windows simultaneously.

Figure 7:
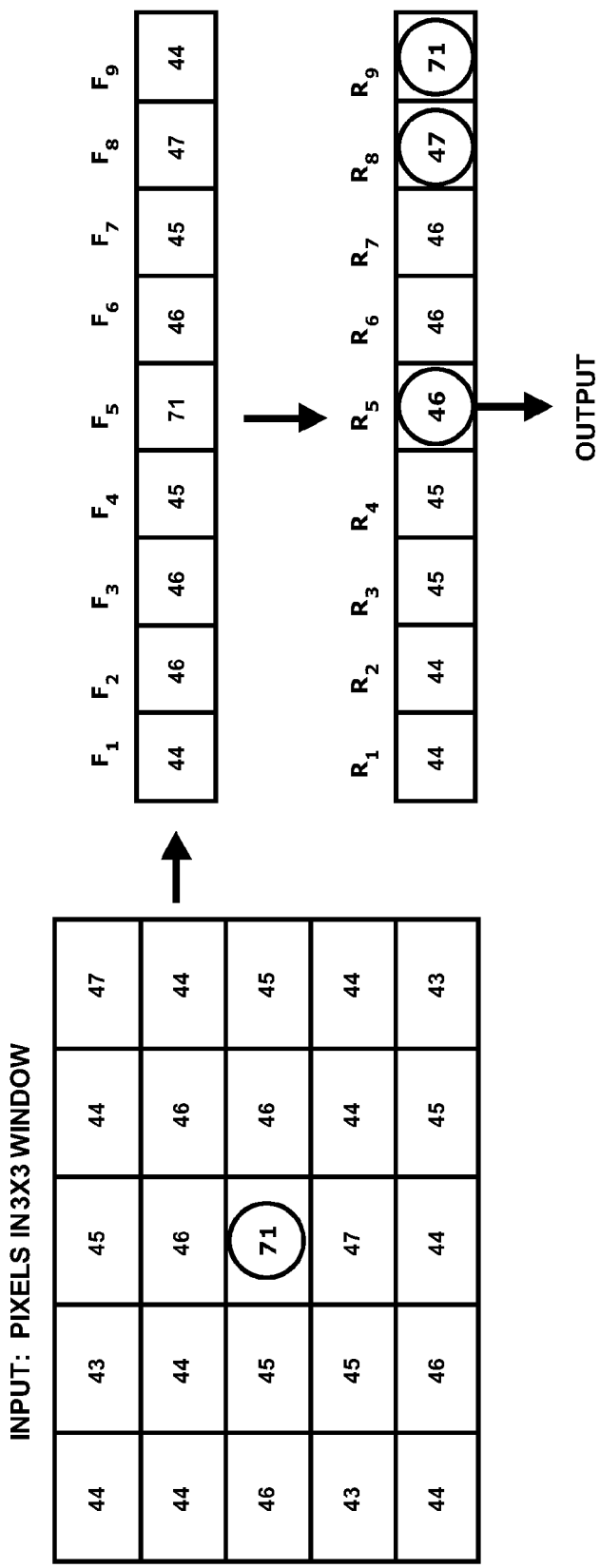
FIG. 7 illustrates a remnant fixed pattern noise filter.

An example of the operation of the filter is shown in FIG. 7, a 3×3 window is shown overlaid on part of an image. The 9 pixel values in the window are repeated in a vector. The center pixel value is 71, and can be considered a positive single-pixel spike compared to all its neighboring pixel values. The ranked pixel values are shown in a vector. The filter detects the noise spike by determining that the center pixel value has rank 9 (is the maximum) and that the difference between the center value and the next smaller value (in this case pixel value 47) is larger than a threshold (e.g. 8). In this case, the center pixel value would be replaced by the median, which is 46 in this example. If the center pixel value had value 48, it would still have rank 9; however, the difference with the pixel at rank 8 would be smaller than the threshold. In that case, a significant spike is not present, and the filter would leave the center pixel value unchanged.

In some cases, small brightness peaks which are part of an image may represent small pixel defects as seen in images of liquid crystal panels during inspection. It is desirable to distinguish between these small pixel defects while removing remnant fixed pattern noise (FPN). One technique to further distinguish between such small pixel defects while removing remnant FPN is to use a rank-based impulse removal (RIR) filter. The RIR filter may be characterized as using a sliding 3×3 window that passes over the image pixels. At any position, the system may have 9 pixel values inside the 3×3 window, which may be denoted as a vector $[f_1, f_2, f_3, f_4, f_5, f_6, f_7, f_8, f_9]$. The ordering is such that $f_5$ is the center pixel in the 3×3 window. The other pixels are neighboring pixels. These pixel values may be ranked from low to high, and the resulting vector of ranked pixel values is denoted given by $[r_1, r_2, r_3, r_4, r_5, r_6, r_7, r_8, r_9]$, where $r_1 \leq r_2 \leq r_3 \ldots \leq r_9$. In other words, $r_1$ is the pixel value in the window with rank 1, i.e. the minimum; $r_9$ is the pixel value in the window with rank 9, i.e. the maximum; and $r_5$ is the median pixel value. In order to classify the center pixel ($f_5$) as a noise spike due to remnant FPN, the following three conditions should be satisfied.

First, to classify the center pixel as a noise spike the system determines whether the center pixel value has either rank 1 (the minimum in the window) or rank 9 (the maximum in the window). If the center pixel does not have rank 1 or 9, it is not a noise spike and no action is taken. In this case, the center pixel is not replaced and retains its original value.

Second, to classify the center pixel as a noise spike the system determines pixel value differences. The center pixel should have a sufficiently different value from all the other pixel values in the window, in order for the center pixel to be classified as a noise spike. Namely, if the center pixel value has rank 1, then the system determines the difference between the center pixel value ($r_1$) and the pixel with the next higher value ($r_2$). Or, if the center pixel has rank 9, then the system determines the difference between the center pixel ($r_9$) and the pixel with the next lower value ($r_8$). If the absolute value of this difference is not larger than a pre-specified threshold $T_{RD}$ then the center pixel is not classified as a noise spike and no action is taken.

Third, to classify the center pixel as a noise spike the system determines pixel value differences. The values of the pixels other than the center pixel should be sufficiently similar to one another. Namely, if the center pixel value has rank 1, then the system determines the differences between the pixel value with rank 2 ($r_2$) and the values of pixels with rank 8 ($r_8$) and rank 9 ($r_9$). Or, if the center pixel value has rank 9, then the system determines the differences between the pixel value with rank 8 ($r_8$) and the values of pixels with rank 1 ($r_1$) and rank 2 ($r_2$). The system computes the sum of the squared differences. If the sum of squared differences is not smaller than a pre-specified threshold $T_{RV}$, then the center pixel is not classified as a noise spike and no action is taken.

If all three conditions are satisfied, the center pixel may be classified as a noise spike due to remnant FPN, and the center pixel value may be replaced by the pixel with rank 2 or by the pixel with rank 8. Namely, if the center pixel has rank 1, it is replaced by the pixel with rank 2; but if the center pixel has rank 9, it is replaced by the pixel with rank 8. The rank-based impulse removal filter may be characterized as follows:

$$\hat{f}_c \leftarrow \begin{cases} r_2 & \text{if } (f_5 = r_1) \wedge (r_2 - r_1 > T_{RD}) \wedge \begin{pmatrix} (r_2 - r_8)^2 + \\ (r_2 - r_9)^2 < T_{RV} \end{pmatrix} \\ r_8 & \text{if } (f_5 = r_9) \wedge (r_9 - r_8 > T_{RD}) \wedge \begin{pmatrix} (r_8 - r_1)^2 + \\ (r_8 - r_2)^2 < T_{RV} \end{pmatrix} \\ f_5 & \text{otherwise} \end{cases}$$

where $\hat{f}_c$ is the estimate for the center pixel. An example threshold value is $T_{RD}=8$ and $T_{RV}=20$. Note that the threshold value may be fixed. Alternatively, the threshold may be decided adaptively, based on an estimate of the strength of the remnant FPN.

The sequence of steps used to determine the RIR filter output may be modified, as desired. For example, different ranking (sorting) techniques may be used. Another example may include the filter being optimized by using a filter that does not use a complete ranking. Also, the filter may be optimized by further considering and processing the pixel values in multiple, neighboring, windows simultaneously.

Figure 8:
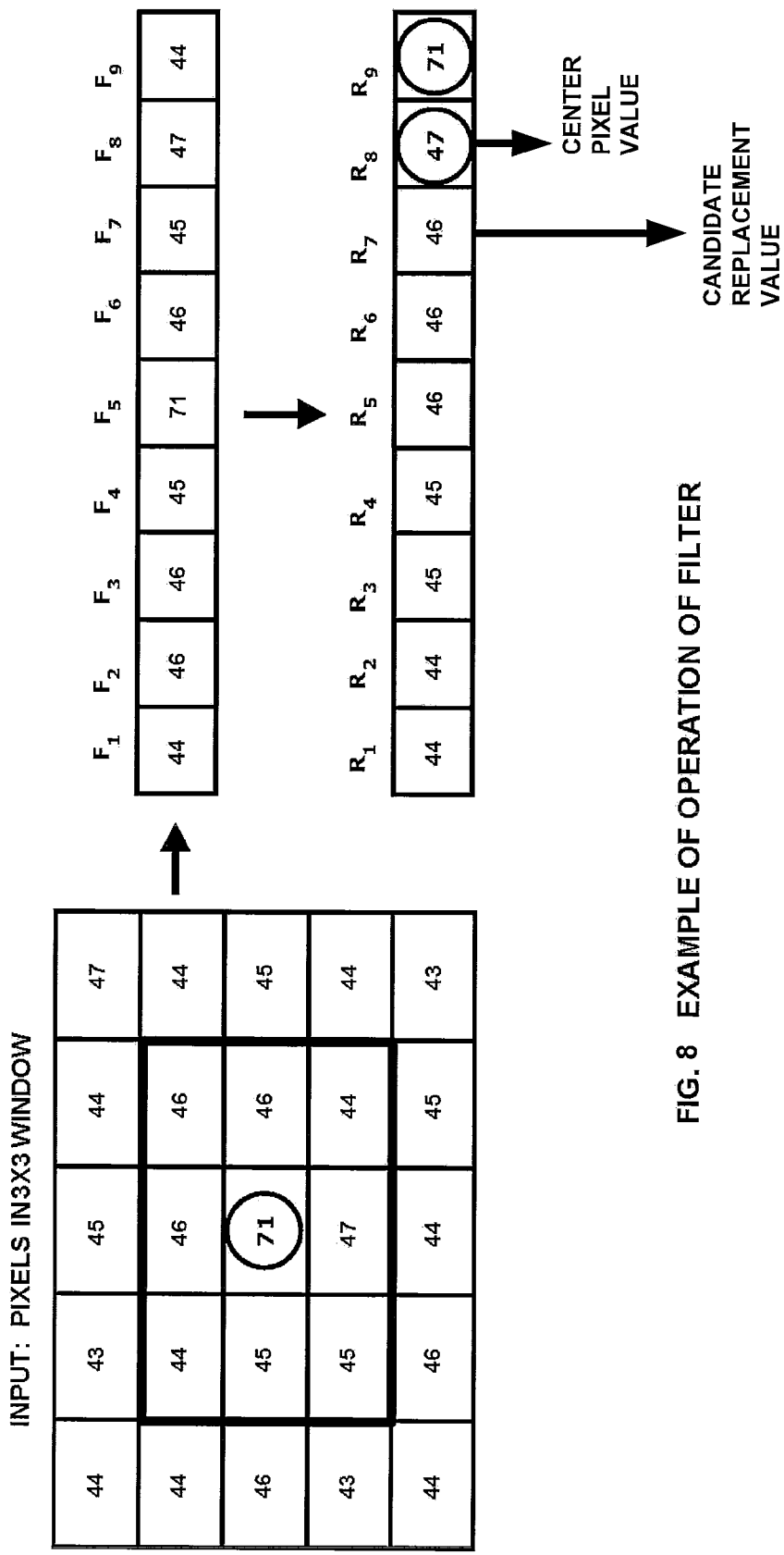
FIG. 8 illustrates another remnant fixed pattern noise filter.

One exemplary operation of the filter is shown in FIG. 8. A 3×3 window is shown overlaid on part of an image. The 9 pixel values in the window are repeated in a vector. The center pixel value is 71, and can be considered a positive single-pixel spike compared to all its neighboring pixel values. The ranked pixel values are shown in a vector. The filter detects the noise spike by determining that:

(1) the center pixel value has rank 9 (condition 1);
(2) the difference between the center value and the next smaller value (in this case pixel value 47) is larger than a threshold (condition 2); and
(3) the pixel values other than the center pixel are similar to each other (condition 3); this may be determined by computing the difference between $r_8$ and $r_1$ and the difference between $r_8$ and $r_2$, and determining that the sum of squared differences is smaller than a threshold.

In this case, the center pixel value would be replaced by the value 47.

The final step in the on-line noise reduction stage, after FPN removal, is suppression of the temporal random noise, containing both readout noise and shot noise. The remaining random noise may be suppressed using a spatial neighborhood filter. For the purposes of this section, the image data at this stage may be modeled as follows, $$g(i,j)=f(i,j)+n_T(i,j) \quad \text{Equation 14}$$

where: f(i,j) is the "true" image, g(i,j) is the given data; and $n_T(i,j)$ is temporal random noise. Again the "true" image features should not be suppressed in this stage while maintaining a low processing time. The system may utilize a specific instance of the so-called Adaptive Noise Smoothing filter extended to improve its performance. The Extended Adaptive Noise Smoothing filter is based on local statistics and may be defined as follows. The filter uses a sliding window, e.g. a 5×5 square window, of pixels centered on the center pixel to be processed. The filter window size W is a parameter. Suppose the sliding window is center on a pixel at location (i,j). Let $\bar{g}(i,j)$ be an estimate of the local mean of the given image g(i,j). The system can determine this value by computing the average pixel value in the local window around j). The estimate may be proved by restricting the set of pixels inside the window that is used to compute the local mean. Namely, only include a pixel value g(m,n) if its absolute difference with the center pixel value is smaller than a threshold $T_{ANS}$. That is, if $|g(m,n)-g(i,j)|<T_{ANS}$, then g(m,n) contributes to the local mean. An example value of the threshold is $T_{ANS}=10$. This local mean is theoretically equal to the local mean of the noise-free image ("true") image f(i,j), because the noise is zero-mean. This local mean $\bar{g}(i,j)$ itself may serve as an estimate of the noise-free pixel value f(i,j); however, the ANS filter improves upon this by adaptively weighting this local mean with the input pixel value g(i,j). This weighting action serves to prevent suppression of local image features, which may result because $\bar{g}(i,j)$ was obtained by local spatial averaging. In this weighting, the ANS filter takes into account an estimate of the local noise strength, as well as an estimate of the local signal variance, as follows.

Let $v_g(i,j)$ be an estimate of the local variance of g(i,j). The system can determine this value by compute a local variance statistic of the pixel values in the local window around (i,j). The system may improve this estimate by again restricting the set of pixels inside the window that is used to compute this local variance. Namely, only include a pixel value g(m,n) if its absolute difference with the center pixel value is smaller than a threshold $T_{ANS}$. That is, if $|g(m,n)-g(i,j)|<T_{ANS}$, then g(m,n) contributes to the local variance.

Let $v_n(i,j)$ be an estimate of the variance of the temporal noise at (i,j). According to the noise model, the system can form an estimate of this variance as follows.

$$v_n(i,j)=\sigma_{READ}^2+\alpha\cdot f(i,j)=\sigma_{READ}^2+\alpha\cdot\bar{g}(i,j) \quad \text{Equation 15}$$

Here, the system uses the random noise parameters estimated in the off-line stage. Now, the system can estimate the local variance in the noise-free image, $v_f(i,j)$, as follows.

$$v_f(i,j)=(v_g(i,j)-v_n(i,j))_+ \quad \text{Equation 16}$$

That is, the system subtracts the estimate of the noise variance from the estimate of the variance of the given image, and clips the value at 0 (to avoid negative values).

The final estimate of the local noise-free pixel value is computed as follows:

$$\hat{f}(i,j)=\frac{v_n(i,j)\cdot\bar{g}(i,j)+v_f(i,j)\cdot g(i,j)}{v_f(i,j)+v_n(i,j)} \quad \text{Equation 17}$$

As can be seen from equation 17, the ANS filter computes a balance between the local mean $\bar{g}(i,j)$ and the noisy input value g(i,j). The weighting is decided locally based on the strength of the local noise relative to the local signal variance. Near image features, the local signal variance is high, therefore, the input value is weighted higher than the local mean, preserving the feature. In image areas that are free of features (e.g. flat areas), the local signal variance is low, therefore, the local mean is weighted higher, providing a noise suppression effect. It is noted that the threshold value $T_{ANS}$ may be fixed. Alternatively, the threshold may be decided adaptively, based on an estimate of the strength of the noise. For example, the threshold may be set to a multiple of the local standard deviation of the noise, or an estimate thereof.

Another suitable filter is a Modified Adaptive Noise Smoothing (M-ANS) filter. The filter preferably preserves smaller brightness peaks in the input image which may represent brightness peaks in the image and may represent image features such as pixel defects in LCD panels. The filter may be based upon computing a modified local variance. This modified local variance may be used to detect small brightness peaks. The modified local variance becomes large in the area of a brightness peak and as a result of the M-ANS filter performs almost no noise smoothing. In other areas, such as background areas, the M-ANS filter provides the same noise smoothing capability as a non-modified ANS filter.

Figure 9:
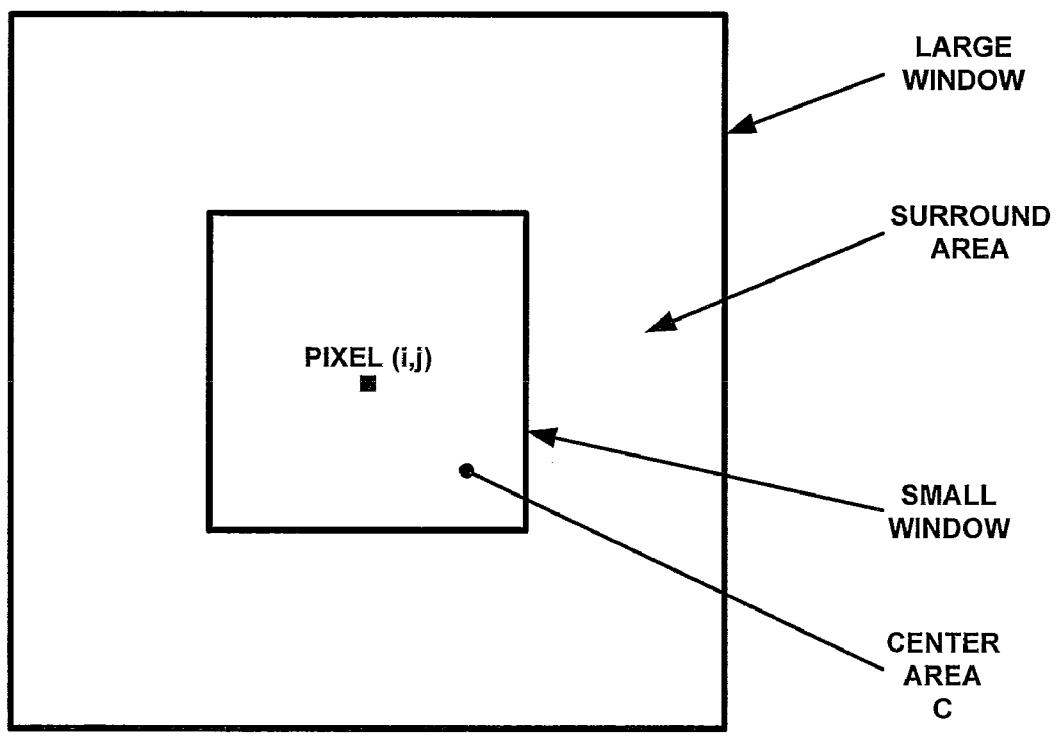
FIG. 9 illustrates a M-AND noise filter.

The M-ANS filter may be based on local statistics and may be defined as follows. The filter may use a sliding window, e.g., a 7×7 square window, of pixels centered on the center pixel to be processed. The filter window size Q1 is a parameter. Suppose the sliding window is centered on a pixel at location (i,j). Inside the first filter window there is a second, smaller, window. The size of the smaller filter window W2 is a parameter, for example a 3×3 square window. These local windows are illustrated in FIG. 9. The filter may use a center area (C), which may be defined by the pixels in the small window. The filter uses a surround area (S), which may be defined by the pixels that are in the large window but not in the small window.

The filter may compute the mean of the pixels in the surrounding area $\mu_s$ as follows:

$$\mu_s=\sum_{l,m\in S}g(l,m)$$

Then, the system computes a modified local variance based on the differences between the pixel values in the center area C and the mean of the surrounding area S as follows:

$$csv_g(i,j)=\frac{1}{N_C}\sum_{l,m\in c}[g(l,m)-\mu_s(i,j)]^2$$

This modified local variance may be denoted by "center surround variance" $csv_g$.

Let $\bar{g}(i,j)$ be an estimate of the local mean of the given image $\bar{g}(i,j)$. The system can determine this value by computing the average pixel value in the local window around (i,j), for example as illustrated in FIG. 9 The ANS filter may compute an estimate of the noise-free pixel value f(i,j) by adaptively weighting this local mean $\bar{g}(i,j)$ with the input pixel value $\bar{g}(i,j)$. This weighting action serves to prevent suppression of local image features, which may result because $\bar{g}(i,j)$ was obtained by local spatial averaging. The M-ANS filter takes into account an estimate of the local noise strength, as well as an estimate of the local signal variance, as follows.

Let $v_n(i,j)$ be an estimate of the variance of the temporal noise at $(i,j)$. According to the noise model, the system can form an estimate of this variance as follows.

$$v_n(i,j) = \sigma_{READ}^2 + \alpha \cdot \bar{f}(i,j) = \sigma_{READ}^2 + \alpha \cdot \bar{g}(i,j)$$

Here, the system uses the random noise parameters estimated in the off-line stage. Now, the system can estimate the local variance in the noise-free image, $v_f(i,j)$, as follows.

$$v_f(i,j) = (csv_g(i,j) - v_n(i,j))_+$$

That is, the system subtracts the estimate of the noise variance from the center surround variance of the given image, and clips the value at 0 (to avoid negative values).

The final estimate of the local noise-free pixel value is computed as follows:

$$\hat{f}(i,j) = \frac{v_n(i,j) \cdot \bar{g}(i,j) + v_f(i,j) \cdot g(i,j)}{v_f(i,j) + v_n(i,j)}$$

As can be seen from above, the ANS filter computes a balance between the local mean $\bar{g}(i,j)$ and the noisy input value $g(i,j)$. The weighting is decided locally based on the strength of the local noise relative to the modified local signal variance. If the local windows are centered on a brightness peak (corresponding to a LCD panel pixel defect) and the brightness peak is small, then this peak is contained in the center area (small window), while the surrounding area contains only background and noise. Because $\mu_s$ is the average of the background (non-peak) area, the modified local variance (center surround variance) becomes large in the peak area. In that case, the M-ANS filter will tend to use the original input pixel value; and preserve the brightness peak. The basic ANS filter will be less effective in detecting this brightness peak.

If the local windows are not centered on a brightness peak but on a background area, the mean over the surrounding area should be the same as the mean over the center area. So in the background, the local variance will be small and the M-ANS filter will do more noise smoothing. Hence, the noise smoothing capability of the M-ANS is about the same as for the ANS; however, M-ANS preserves brightness peaks better than ANS. The size of the small window (center area) may be matched to the size of the smallest brightness peak that should be preserved. The size of the large window should be a few pixels larger.

Near image features, the local signal variance is high, therefore, the input value is weighted higher than the local mean, preserving the feature. In image areas that are free of features (e.g. flat areas), the local signal variance is low, therefore, the local mean is weighted higher, providing a noise suppression effect. It is noted that the threshold value $T_{ANS}$ may be fixed. Alternatively, the threshold may be decided adaptively, based on an estimate of the strength of the noise. For example, the threshold may be set to a multiple of the local standard deviation of the noise, or an estimate thereof.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A method for reducing noise in an image from an image capture device comprising:
   (a) receiving an image from an image capture device;
   (b) processing said image in a manner to reduce offset fixed pattern noise in said image;
   (c) processing said image in a manner to reduce gain fixed pattern noise in said image;
   (d) filtering said filtered image as a result of step (b) and step (c) using a remnant fixed pattern noise filter applied over a first sliding window to reduce remnant fixed pattern noise, wherein said remnant fixed pattern noise filter is characterized by including an impulse filter applied over a second sliding window, smaller than and within, said first sliding window.

2. The method of claim 1 wherein said remnant fixed pattern noise filter is further characterized by including a rank of pixels within said second sliding window.

3. The method of claim 2 wherein said second sliding window is a 3×3 window.

4. The method of claim 2 wherein said rank of pixels is in a sequential rank order.

5. The method of claim 4 wherein a center pixel of said first sliding window is selectively modified based upon said remnant fixed pattern noise filter.

6. The method of claim 5 wherein said selective modification includes a condition that said center pixel has a minimum or a maximum of said pixels of said second sliding window.

7. The method of claim 6 wherein said selective modification includes a condition based upon pixel value differences.

8. The method of claim 7 wherein said pixel value differences is based upon said center pixel being sufficiently different from all other pixel values in said second sliding window.

9. The method of claim 8 wherein said pixel value differences is further based upon said all other pixel values being sufficiently similar to each other.

10. The method of claim 9 wherein said remnant fixed pattern noise filter is characterized by:

$$\hat{f}_c \leftarrow \begin{cases} r_2 & \text{if } (f_5 = r_1) \wedge (r_2 - r_1 > T_{RD}) \wedge \begin{pmatrix} (r_2 - r_8)^2 + \\ (r_2 - r_9)^2 < T_{RV} \end{pmatrix} \\ r_8 & \text{if } (f_5 = r_9) \wedge (r_9 - r_8 > T_{RD}) \wedge \begin{pmatrix} (r_8 - r_1)^2 + \\ (r_8 - r_2)^2 < T_{RV} \end{pmatrix} \\ f_5 & \text{otherwise} \end{cases}$$

where $\hat{f}_c$ is a filtered value of a target pixel, $f_i$ is the value of the $i^{th}$ pixel in a matrix about said target pixel $r_i$ is the $i^{th}$ ranked value in said matrix, and $T_{RCM}$ is a threshold.

11. A method for reducing noise in an image from an image capture device comprising:
   (a) receiving an image from an image capture device;
   (b) processing said image in a manner to reduce offset fixed pattern noise in said image;
   (c) processing said image in a manner to reduce gain fixed pattern noise in said image;
   (d) filtering said filtered image as a result of step (b) and step (c) using a remnant fixed pattern noise filter to reduce remnant fixed pattern noise;
   (e) filtering the result of step (d) using a random noise filter that selective modifies a center pixel, wherein said random noise filter is characterized by including a first window centered on said center pixel and a second smaller window centered on said center pixel, wherein said random noise filter uses a pair of filters, a first filter based upon said pixels in said second window and a second filter based upon pixels in said first window and not in said first second window.

12. The method of claim 11 wherein said random noise filter is further characterized by said second filter being a mean based filter.

13. The method of claim 12 wherein said random noise filter is further characterized by said first filter being a variance based filter.

14. The method of claim 13 wherein said variance based filter is based upon differences between pixel value in the second window and said mean based filter.

15. A method for reducing noise in an image from an image capture device comprising:

(a) receiving an image from an image capture device;

(b) processing said image in a manner to reduce offset fixed pattern noise in said image;

(c) processing said image in a manner to reduce gain fixed pattern noise in said image;

(d) filtering said filtered image as a result of step (b) and step (c) using a remnant fixed pattern noise filter to reduce remnant fixed pattern noise, wherein said remnant fixed pattern noise filter is characterized by including an impulse and by including a rank of pixels in sequential rank order within a window; and (e) wherein a center pixel of said window is selective modified by said remnant fixed pattern noise filter if said center pixel has a minimum or a maximum of said pixels of said window.

16. The method of claim 15 wherein said selective modification includes a condition based upon pixel value differences.

17. The method of claim 16 wherein said pixel value differences is based upon said center pixel being sufficiently different from all other pixel values in said window.

18. The method of claim 17 wherein said pixel value differences is further based upon said all other pixel values being sufficiently similar to each other.

19. The method of claim 18 wherein said remnant fixed pattern noise filter is characterized by:

$$\hat{f}_c \leftarrow \begin{cases} r_2 & \text{if } (f_5 = r_1) \wedge (r_2 - r_1 > T_{RD}) \wedge \begin{pmatrix} (r_2 - r_8)^2 + \\ (r_2 - r_9)^2 < T_{RV} \end{pmatrix} \\ r_8 & \text{if } (f_5 = r_9) \wedge (r_9 - r_8 > T_{RD}) \wedge \begin{pmatrix} (r_8 - r_1)^2 + \\ (r_8 - r_2)^2 < T_{RV} \end{pmatrix} \\ f_5 & \text{otherwise} \end{cases}$$

where $f_c$ is a filtered value of a target pixel, $f_i$ is the value of the $i^{th}$ pixel in a matrix about said target pixel r, is the $i^{th}$ ranked value in said matrix, and $T_{RCM}$ is a threshold.

* * * * *

UNITED STATES PATENT AND TRADEMARK OFFICE
CERTIFICATE OF CORRECTION

PATENT NO.         : 8,355,064 B2
APPLICATION NO.    : 13/100060
DATED              : January 15, 2013
INVENTOR(S)        : Petrus J. L. van Beek It is certified that error appears in the above-identified patent and that said Letters Patent is hereby corrected as shown below:

In the Specifications

Col. 9, Line 48

Change " $v_n(i,j) = \sigma_{READ}^2 + \alpha \cdot \bar{f}(i,j) = \sigma_{READ}^2 + \alpha \cdot \bar{g}(i,j)$ "

to read -- $v_n(i,j) = \sigma_{READ}^2 + \alpha \cdot \tilde{f}(i,j) = \sigma_{READ}^2 + \alpha \cdot \bar{g}(i,j)$ --.

Col. 11, Line 8

Change " $v_n(i,j) = \sigma_{READ}^2 + \alpha \cdot \bar{f}(i,j) = \sigma_{READ}^2 + \alpha \cdot \bar{g}(i,j)$ "

to read -- $v_n(i,j) = \sigma_{READ}^2 + \alpha \cdot \tilde{f}(i,j) = \sigma_{READ}^2 + \alpha \cdot \bar{g}(i,j)$ --.

Col. 14, Line 26

Change "r," to read -- $r_j$ --.

Signed and Sealed this
Twenty-third Day of April, 2013

Teresa Stanek Rea
*Acting Director of the United States Patent and Trademark Office*